United States Patent [19]
Lee

[11] Patent Number: 5,237,009
[45] Date of Patent: * Aug. 17, 1993

[54] ELECTROSTATIC DISSIPATING COMPOSITIONS

[75] Inventor: Biing-lin Lee, Broadview Heights, Ohio

[73] Assignee: The B. F. Goodrich Company, Akron, Ohio

[*] Notice: The portion of the term of this patent subsequent to Jun. 11, 2008 has been disclaimed.

[21] Appl. No.: 690,468

[22] Filed: Apr. 24, 1991

Related U.S. Application Data

[63] Continuation-in-part of Ser. No. 379,393, Jul. 13, 1989, Pat. No. 5,023,036.

[51] Int. Cl.$^5$ ............ C08G 65/08; C08G 65/24; C08L 25/04
[52] U.S. Cl. .................... 525/187; 524/910
[58] Field of Search ................ 525/187; 524/910

[56] References Cited

U.S. PATENT DOCUMENTS

| | | | |
|---|---|---|---|
| 4,230,827 | 10/1980 | Myers | 525/121 |
| 4,559,164 | 12/1985 | Kostelnik et al. | 525/496 |
| 4,588,773 | 5/1986 | Federi et al. | 525/187 |
| 4,719,263 | 1/1988 | Barnhouse et al. | 525/187 |
| 4,775,716 | 10/1988 | Kipouras | 525/64 |
| 5,010,139 | 4/1991 | Simon | 525/187 |
| 5,023,036 | 6/1991 | Lee et al. | 525/64 |

FOREIGN PATENT DOCUMENTS

| | | |
|---|---|---|
| 0282985 | 3/1988 | European Pat. Off. |
| 0294722 | 3/1988 | European Pat. Off. |

*Primary Examiner*—James J. Seidleck
*Assistant Examiner*—Thomas Hamilton, III
*Attorney, Agent, or Firm*—Hudak & Shunk Co.

[57] ABSTRACT

Disclosed is a composition for dissipating an electrostatic charge in a polymer matrix. The composition includes an oxirane copolymer wherein said copolymer is prepared from ethylene oxide and either a heterocyclic monomer or a vinyl type monomer. The polymer matrix is either a plastic or an elastomer. In a further embodiment, a third constituent of non ESD polymer or non ESD filler is utilized in the composition to further enhance the electrostatic dissipating performance, and optionally also toughness of the composition.

4 Claims, No Drawings

ELECTROSTATIC DISSIPATING COMPOSITIONS

CROSS-REFERENCE

This is a continuation-in-part of copending application, Ser. No. 07/379,393, filed Jul. 13, 1989, entitled "Electrostatic Dissipating Compositions and Method Relating Thereto.", now U.S. Pat. No. 5,023,036.

FIELD OF THE INVENTION

The present invention relates to electrostatic dissipating compositions having improved properties. These compositions are a two or more phase system including a polymer matrix that is either plastic or elastomeric. The composition further comprises an electrostatic dissipating "ESD" polymer and a third nonelectrostatic dissipating phase which is incompatible with the "ESD" agent and acts as an ESD promoter.

BACKGROUND ART

Polymer compositions are often considered for use as electrical insulating materials, because they typically do not readily conduct electrical current and are generally rather inexpensive relative to other known insulating materials. A number of known polymer compositions are sufficiently durable and heat resistant to provide at least some electrical insulating utility, but many such polymer compositions are problematic due to the accumulation of electrostatic charge on the surface of the material.

The accumulation of surface charge on an insulating material is undesirable for various reasons. Such materials sometimes discharge very quickly, and this can damage electronic components, or cause fires or explosions, depending upon the environment. Sudden static discharge can also be an annoyance to those using the material.

Even where sudden static discharge is not a problem, dust will typically be attracted to and will accumulate on materials carrying a static charge. Furthermore, the static charge can interfere with sensitive electronic components or devices and the like.

Consequently, a need exists for electrostatic dissipating ("ESD") polymeric compositions having an appropriate resistivity. That is, these compositions must have sufficient resistivity to cause the "bleeding off" or dissipation of any occurring static charge. The resistivity must not be so low as to allow the charge to move too quickly through the material, thereby causing an arc or spark. On the other hand, the resistivity must not be so great as to cause the charge to build up to such a high level as to ultimately cause a sudden discharge (spark or arc).

Resistivity can be further defined as involving surface resistivity and volume resistivity. If the volume resistivity is in an appropriate range, an alternative pathway is provided through which a charge can dissipate. However, many conventional electrostatic dissipative materials, particularly materials comprising low molecular weight antistatic agents, provide electrostatic dissipative properties primarily by means of surface resistivity. As a result, surface resistivity is typically the primary focus for electrostatic dissipating materials.

Surface resistivity is an electrical resistance measurement (typically measured in Ohms per square) taken at the surface of a material at room temperature. Where the surface resistivity is less than or equal to about $10^5$, the composition's surface has very little insulating ability and is generally considered to be conductive. Such compositions are generally poor electrostatic dissipating polymeric materials, because the rate of bleed off is too high and sparking or arcing can occur.

Where the surface resistivity is greater than $10^{12}$, the composition's surface is generally considered to be an insulator. In certain applications, such a composition is also a poor electrostatic dissipating material, because the surface does not have the requisite amount of conductivity necessary to dissipate static charge.

Typically where the surface resistivity is about $10^6$ to $10^{12}$, any charge contacting the surface will readily dissipate or "decay". Further information involving the evaluation of surface resistivity can be found in American Standard Test Method D257.

Static charge decay rates measure the ability of an electrostatic dissipating (ESD) material to dissipate charge. A 90 percent decay time as used herein is measured at about 15 percent relative humidity and at ambient temperature as follows: a 5000 Volt charge is placed upon the material and the amount of time (in seconds) for the charge to dissipate to 500 Volts is measured. A 99 percent decay time is measured substantially as for the 90 percent decay time, except that the amount of time measured is for the charge to dissipate to 50 Volts.

Many electrostatic dissipating materials generally found in the art have a 90 percent decay time of greater than about 3 seconds and a 99 percent decay time of greater than about 5 seconds. However, the National Fire Protection Association standard (NFPA Code 56A) requires 0.5 seconds as an upper limit for a 90 percent decay time, and the U.S. Military Standard (MIL-81705B) requires 2.0 seconds as an upper limit for a 99 percent decay time.

Attempts have been made to coat an electrostatic dissipative material onto an insulating plastic to reduce the accumulation of static charge. Surface applications however have been problematic due to long term adhesion requirements and interference with surface properties.

Other attempts to reduce the accumulation of static charge include the addition of graphite, metals, organic semiconductors or other low molecular weight antistatic agents. However, problems have arisen relating to the processability and/or the physical properties of the resulting product.

Rigid additives, such as metal and graphite, often deteriorate the physical and mechanical properties of the plastic. Such additives can also be expensive and make processing difficult.

Conventional low molecular weight electrostatic additives typically work well only in the presence of high relative humidity. Such additives typically must bloom to the surface after blending or mixing to provide electrostatic dissipative performance, and such blooming may not always be consistent or may cause thermal stability problems or may cause physical properties to deteriorate. Such additives can also create an undesirable film or can wash away or abrade from the surface.

Low molecular weight electrostatic dissipating additives generally can be blended with polymers having a high glass transition temperature, such as rigid polyvinyl chloride (PVC), polystyrene, acrylonitrile-butadiene-styrene (ABS), styrene-acrylonitrile (SAN), and styrene-maleic anhydride (SMA); however the high glass transition temperature of such plastics typically hinders subsequent migration of the electrostatic dissipating additives to the surface of the cooled parts, and such migration is typically necessary to obtain desired electrostatic properties. Blending may also require such high temperatures as to cause discoloration, instability and degradation of the material.

The following patents relate to the incorporation of high molecular weight (polymeric) electrostatic dissipating agents into plastic.

U.S. Pat. No. 4,588,773 to Federal et al discloses an electrostatic dissipating thermoplastic composition comprising a copolymer of acrylonitrile, butadiene, and styrene (ABS) and a copolymer of epihalohydrin copolymer.

U.S. Pat. No. 4,775,716 to Kipouras et al discloses an electrostatic dissipating ABS blend comprising epihalohydrin-oxirane copolymer wherein the amount of ABS is 80 percent by weight or more. The required ratio of epihalohydrin to oxirane is defined as being between about 1:19 to about 7:13 by weight.

U.S. Pat. No. 4,719,263 to Barnhouse et al discloses an electrostatic dissipating Composition comprising an epihalohydrin homopolymer or copolymer and chlorinated polyvinyl chloride, polycarbonate, polyester, epoxy, phenolics, or mixtures thereof.

Published European application no. 282,985 to Yu discloses a copolymer of epihalohydrin and ethylene oxide as an electrostatic dissipating additive. The preferred composition is defined as being at least 60 percent by weight ethylene oxide.

U.S. application Ser. No. 039,258, filing date Apr. 17, 1987, to Yu is directed to an electrostatic dissipating polymeric composition comprising an electrostatic dissipating copolymer of ethylene oxide and a comonomer selected from the group consisting of cyclic ethers, cyclic acetals, and cyclic esters. The polymeric composition can further comprise any thermoplastic, thermoplastic elastomer or elastomer.

Published European application Ser. No. 294,722 discloses the use of polymethylmethacrylate (PMMA) in blends of SAN containing epichlorohydrin copolymer.

U.S. Pat. No. 4,230,827 to Myers discloses ethylene oxide polymers as being useful as impact modifiers for PVC. The Myers patent teaches that the ethylene oxide polymer must be comprised of at least about 80 percent by weight ethylene oxide. The ethylene oxide polymer is further defined as having a viscosity average molecular weight of about 200,000 to about 10,000,000.

SUMMARY OF THE INVENTION

The embodiment of the present invention is directed to compositions comprising three constituents. The first constituent is a polymeric matrix. This matrix represents the predominant component. The second constituent is an electrostatic dissipating agent, i.e., an ESD agent. The third nonelectrostatic dissipating nonconductive constituent acts as a promoter for the ESD agent by acting synergestically with this agent. Thus, surprisingly, while this third constituent generally does not act as an ESD agent by itself, when it is blended with the ESD agent into the matrix material it acts synergistically to enhance the ESD properties of the blend composition and also to enable the amount of ESD agent to be reduced while maintaining the same overall ESD properties of the composition. In other words, for applications where rigidity may be significant, the inclusion of the third constituent and the reduction of the ESD agent could be used to maintain the rigidity or toughness of the composition while also imparting the ESD properties to the composition. In original embodiment as set forth in U.S. Ser. No. 07/379,393, the invention relates to a method of manufacturing an electrostatic dissipating material (and compositions derived therefrom), wherein the method comprises:

heat mixing or blending a first, a second and a third component in at least two steps, whereby in a first step, the second and third components are heat mixed or blended together, and then in a subsequent second step the first component is heat mixed or blended with the mixture comprising the second and third components, wherein the first component comprises a polyolefinic, urethane, condensation, vinylic or styrenic polymer, the second component comprises an oxirane copolymer, and the third component comprises a polymer additive.

DETAILED DESCRIPTION

The original embodiment is directed generally to blends having a first component comprising any polymer and preferably comprising a polyolefinic, urethane, condensation, vinylic or styrenic polymer or a mixture thereof. Preferred polyolefins include high density polyethylene, low density polyethylene, very low density polyethylene, linear low density polyethylene, polypropylene, polybutene, polycycloolefin, ethylene-propylene terpolymer, grafted variations there and the like.

Preferred urethanes include polyester and polyether urethanes. Preferred condensation polymers include polycarbonate, polyesters, and polyamides. Preferred styrenic polymers include polystyrene, high impact polystyrene (HIPS), styrene-methyl methacrylate (SMMA), acrylonitrile-butadiene-styrene (ABS), styrene-acrylonitrile (SAN), and styrene-maleic anhydride (SMA).

Preferred vinyl polymers include 1) acrylates, such as homo and copolymers substantially derived from the following monomers: acrylic acid, methacrylic acid, methyl methacrylate, ethyl acrylate, propyl acrylate, butyl acrylate, 2-ethylhexyl acrylate, and acrylic monomers that contain hydroxyl, epoxy or halogen moieties; 2) polyvinyl chloride (PVC); 3) chlorinated polyvinyl chloride (CPVC); and 4) polyvinyl acetate.

The preferred polyolefin is polyethylene or polypropylene. The preferred urethane is polyester. The preferred condensation polymer is a polyamide. The preferred styrenic polymer is ABS, and the preferred vinylic polymer is PVC.

The first component can also comprise secondary ingredients such as stabilizers and the like. Such additives are well known in the art and can be used in typical amounts, provided they do not effect the performance of the final product adversely.

Appropriate secondary components can be determined using ordinary skill and experimentation, depending upon what polymer(s) is (are) chosen for use as part of the first component.

Nothing has been discovered which would suggest that other polymers could not also be used as the first component of the original embodiment. For a particular application or performance requirement, certain polymers might work better than others. However, this would have to be determined using ordinary skill and experimentation after reading this specification and accompanying claims. Due to the wide variety of possible applications of this invention, it would be impossible to list each and every possible embodiment.

The original embodiment further comprises a second component which is an electrostatic dissipating oxirane copolymer. The copolymer preferably comprises the electrostatic dissipating polymer product of the following comonomers:

i) ethylene oxide in the range from about 5 percent to about 95 percent by weight; and ii) at least one heterocyclic comonomer in the range of from about 95 percent to about 5 percent by weight, whereby the cyclic comonomer comprises a ring comprising an oxygen atom and at least 2 carbon atoms, wherein the ring is either free of pendent groups or comprises a pendant group which is further defined as a substituted or unsubstituted, saturated, unsaturated or partially saturated: a) aliphatic, particularly alkyls and haloalkyls; b) cycloaliphatic; c) aromatic; or d) combinations thereof.

The preferred ethylene oxide copolymer comprises ethylene oxide and epihalohydrin or propylene oxide. The most preferred ethylene oxide copolymer comprises ethylene oxide and epichlorohydrin in a weight ratio of about 80:20.

The original embodiment further comprises a third component which comprises an appropriate blend additive. Depending upon the first and second components of the blend, this third component could be a plasticizer, stabilizer, antioxidant, antiozonant, filler, fiber, impact modifier and/or the like. Useful blending or compounding additives are well known in the art, and appropriate additives and amounts can be determined using ordinary experimentation. Although such blend additives typically have no electrostatic dissipating properties by themselves, they have been surprisingly found to enhance electrostatic dissipating and other properties when used according to the present invention.

The most preferred first component comprises PVC and one or more conventional PVC stabilizers, additives or the like. The most preferred second component comprises ethylene oxide/epichlorohydrin (EO/ECH) copolymer having a preferred weight ration of about 4:1, and the most preferred third component comprises any conventional antioxidant, such as IRGANOX 1010 by Ciba Geigy. The three components are preferably blended together in a two-step process according to the original embodiment wherein the second and third components are initially heat mixed or blended together and the first component is then heat mixed or blended with the material comprising the second and third component.

The two or more step blending process has been unexpectedly found to provide an end product having superior electrostatic dissipative, tensile and/or impact properties than the end product arising from a single step blending. Furthermore, the two-step method has been found in some cases to improve the volatilizing off of unwanted solvent, contaminants or the like which might be found in any of the three components.

Preferably, the blending is accomplished at a temperature greater than the melting temperature of the components being mixed. The most preferred temperature is that which would be high enough to volatilize off any unwanted contaminants within the components without deleteriously effecting the material (i.e., thermal decomposition). The most preferred temperature for any particular embodiment can be determined using ordinary skill and conventional experimentation.

The term "mixing" as used herein is intended to include any type of physical contacting between components, such as extrusion, milling, stirring and the like. A two-step extrusion could be conducted by adding components at different ports along the extrusion screw. It would be impossible to list each and every type of mixing or mixing operation which would be applicable for the present invention, and certain types of mixing may have to be determined using ordinary skill and experimentation.

EXAMPLE 1A

One-step and two-step blends were made from the following components. The first component comprised commercial grade PVC, a thermal stabilizer, and other conventional additives. The second component comprised ethylene oxide/epichlorohydrin (EO/ECH) copolymer comprising about 76 percent by weight EO, and the third component comprised an antioxidant, IRGANOX 1010 by Ciba Geigy and a processing aid.

For the one-step blends all of the components were heat mixed at once. For the two-step blends, the second and third components were heat mixed in a first step and the first component was then added in a second step. All blending was done using a ribbon blender at about 80° C. Blending time was about 20 minutes for each step of the two-step blend (or for the one-step in the one-step blend). All samples comprised about 80 weight parts PVC (First component), about 15 weight parts EO/ECH (second component), about 2 weight parts antioxidant, IRGANOX 1010 by Ciba Geigy (third component) and about 5 weight parts processing aid. The resulting blends were mixed, pelletized and then injection molded.

All samples were conditioned for 24 hours at 15 percent relative humidity prior to electrostatic dissipating measurement. Temperature cycle testing was conducted for one sample by placing the sample in a room temperature environment (55 percent relative humidity) for about 1.75 hours, then gradually altering the environment to 60° C. (95 percent relative humidity) over the course of about 1.5 hours and held in the 60° C. environment for about 4 hours and then gradually allowed to cool to room temperature over the course of 0.75 hours to complete the cycle; 21 such cycles were performed consecutively to the "cycle tested" sample. Other samples were placed in 60° C. and 70° C. dry forced air ovens for various periods of time to determine heat aging properties. The results of these experiments are provided in Table I.

TABLE I

| Volts:<br>Cutoff: | One-Step Processing | | Two-Step Processing | |
|---|---|---|---|---|
| | 5000 to 0<br>0% | 5000 to 500<br>10% | 5000 to 0<br>0% | 5000 to 500<br>10% |
| Decay Time<br>(in seconds) | | | | |
| After Cycle<br>Testing | .93 | .09 | .30 | .02 |
| 60° C. | | | | |
| 112 hrs. | | | 1.31 | 0.06 |
| 16 hrs. | | | 0.71 | 0.06 |
| 9 hrs. | 2.26 | 0.26 | | |
| 70° C. | | | | |
| 19 hrs. | | | 1.25 | 0.07 |
| 7 hrs. | 1.71 | 0.13 | | |
| Control* | 1.18 | 0.13 | 0.31 | 0.02 |

*No heat aging or cycle testing.

As can be seen by Table I, the two-step blending process improved static decay rates as compared to one-step blending. The improvement can be seen where the material is cycled over temperature extremes and also when the sample is placed in a high temperature environment for extended periods of time.

EXAMPLE 1B

TWO-STEP SAMPLE: In a first step, about 100 weight parts (all "parts" are by weight unless otherwise indicated) of EO/ECH copolymer (having an EO:ECH weight ratio of about 80:20) was mixed with 3 parts thermal stabilizer and 1 part antioxidant using a two roll mill at a temperature of about 140° C. to form a "first mixture". In a second step 24 parts of this first mixture was melt blended with 80 parts PVC and 3 parts thermal stabilizer at a temperature of about 190° C. The resulting material was compression molded and had a 90 percent decay time of 0.14 seconds and a 99 percent decay time of 0.43 seconds.

ONE-STEP SAMPLE: The components used in the two-step sample identified above were each mixed together in a single step using a two roll mill at a temperature of about 190° C. The resulting material was compression molded and had a 90 percent decay time of 0.67 (more than 3 times greater than for the two-step sample) and a 99 percent decay time of 3.67 seconds (more than eight times greater than for the two-step sample).

EXAMPLES 2 THROUGH 13

Regarding the following examples (2-13), blending was accomplished by mechanically melt mixing the indicated ingredients in a 4 inch electric heated mill at 200° C. for about 2 minutes and compression molding at 200° C. for one and a half minutes in a laboratory press.

All parts are by weight unless otherwise indicated. Parenthesis are used to indicate two-step mixing wherein (A+B)+C indicates that A and B were mixed in a first step and the resulting A+B mixture was then mixed with C in a second step. Accordingly, A+B+C indicates that the three components were mixed in a single step.

INGREDIENTS

The following are a list of ingredients used in certain of the samples.

1. POLYPROPYLENE+EO/ECH: 100 parts of a modified polypropylene copolymer, PROFAX SB 222 manufactured by Himont Corporation, was heat mixed with: a) 2 parts antioxidant, IRGANOX 1010 by Ciba Geigy (hereafter referred to as "antioxidant"); b) 100 parts of a copolymer of ethylene oxide/epichlorohydrin ("EO/ECH") in a weight ratio of about 80:20; and c) 3 parts dibutyl tin bisisooctylthio-glycolate thermo-stabilizer, T-31 by M&T Corporation (hereafter referred to as "thermostabilizer").

2. SBS+EO/ECH: The following was heat mixed together: a) 50 parts maleic anhydride grafted S-B-S copolymer, KRATON G by Shell Chemical Company (hereafter referred to as SBS); b) 100 parts of a copolymer of EO/ECH (in a weight ratio of about 80:20); c) 1 part antioxidant; and d) 3 parts thermo-stabilizer.

3. PLASTICIZED EO/ECH: The following was heat mixed together: a) 100 parts of a copolymer of EO/ECH (in a weight ratio of about 80:20); b) 1 part antioxidant; c) 3 parts thermo-stabilizer; and d) 10 parts polyethylene glycol plasticizer, CARBOWAX PEG 400 manufactured by Fisher Scientific (hereinafter referred to as "Plasticizer").

4. SBS+PLASTICIZED EO/ECH: The following was heat mixed together: a) 20 parts SBS; b) 100 parts of a copolymer of EO/ECH (in a weight ratio of about 80:20); c) 1 part antioxidant; d) 3 parts thermo-stabilizer; and e) 10 parts plasticizer.

Static charge decay rates were measured at 20° C., 15 percent relative humidity. The results are summarized in Table II.

EXAMPLE 2

(SBS+EO/ECH)+(POLYPROPYLENE) TWO-STAGE HEAT MIXING (20% EO/ECH)

About 31 parts of the SBS+EO/ECH mixture described above (Ingredient #2) was heat mixed with 70 parts Polypropylene and 0.7 parts antioxidant. The resulting composition had excellent electrostatic dissipating properties. The surface resistivity was $10^{12}$ Ohms per square (all surface resistivity values given herein indicate "Ohms per square" unless other stated), and the 90%/99% decay times were 0.19/0.79 seconds respectively (all decay times given herein indicate "seconds" unless otherwise stated).

Polypropylene and SBS do not provide electrostatic dissipating properties by themselves, while EO/ECH is an excellent electrostatic dissipating material. Further investigation showed that for a Polypropylene+EO/ECH one-step heat mixed material to have excellent electrostatic dissipating properties, the EO/ECH content had to be about 40 percent by weight or greater, and for an SBS+EO/ECH heat mixed material to have excellent electrostatic dissipating properties, the EO/ECH content had to be about 30 percent by weight (all percentages herein are by weight unless otherwise indicated) or greater. Surprisingly, however, a two-step blend of the three components only required less than about 20 percent EO/ECH to obtain excellent electrostatic dissipating properties.

EXAMPLE 3

SBS+EO/ECH+POLYPROPYLENE ONE-STAGE HEAT MIXING (20 PERCENT EO/ECH)

The individual ingredients found in Example 2 were combined and heat mixed together in a single step, and the resulting composition had a surface resistivity of $10^{14}$ and 90%/99% decay times of 1 and greater than 5, respectively (poor electrostatic dissipating properties).

Unlike Example 2, an amount of EO/ECH less than about 20 percent was insufficient to provide electrostatic dissipating properties. Based upon work with Polypropylene+EO/ECH (requiring at least about 40 percent EO/ECH for excellent electrostatic dissipating properties) and SBS+EO/ECH (requiring at least about 30 percent EO/ECH for excellent electrostatic dissipating properties), it is theorized that if the relative amount of EO/ECH were raised to between about 30 percent and 40 percent by weight, then excellent electrostatic dissipating properties could be achieved, and this is indicated by Examples 11 and 13 below.

However, EO/ECH is typically added only for its electrostatic dissipating properties, and such an excessive amount of EO/ECH to obtain the intended electrostatic dissipating properties might also cause other properties of the EO/ECH which may be undesirable to also show themselves in the final material.

EXAMPLE 4

(PLASTICIZED EO/ECH)+(POLYPROPYLENE) TWO-STAGE HEAT MIXING (20 PARTS EO/ECH)

About 23 parts PLASTICIZED EO/ECH (Ingredient 3 listed above) was heat mixed with 76 parts Polypropylene and 7.6 parts antioxidant. The surface resistivity was $10^{11}$ and the 90%/99% decay times were 0.07/0.5 (good electrostatic dissipating properties).

EXAMPLE 5

PLASTICIZED EO/ECH+POLYPROPYLENE ONE-STAGE HEAT MIXING (20 PARTS EO/ECH)

The individual ingredients found in the composition of Example 4 were heat mixed together in a single step, and the resulting composition had a surface resistivity of $10^{13}$, and 90%/99% decay times of greater than 3 and greater than 5 respectively (poor electrostatic dissipating properties).

EXAMPLE 6

(PLASTICIZED EO/ECH)+(POLYPROPYLENE) TWO-STAGE HEAT MIXING (30 PARTS EO/ECH)

About 34 parts Plasticized EO/ECH was heat mixed with 65 parts Polypropylene and 0.65 parts antioxidant. The surface resistivity was $10^{10}$ and the 90%/99% decay times were 0.01/0.04 (excellent electrostatic dissipating properties).

EXAMPLE 7

PLASTICIZED EO/ECH+POLYPROPYLENE ONE-STAGE HEAT MIXING (30 PARTS EO/ECH)

The individual ingredients in the composition of Example 6 were heat mixed together in a single step, and the resulting composition had a surface resistivity of about $10^{12.5}$, and 90%/99% decay times of 0.06/0.4, respectively (much poorer electrostatic dissipating properties than in Example 6).

EXAMPLE 8

(PLASTICIZED EO/ECH)+(POLYPROPYLENE) TWO-STAGE HEAT MIXING (40 PARTS EO/ECH)

About 46 parts PLASTICIZED EO/ECH was heat mixed with 55 parts Polypropylene and 0.55 parts antioxidant. The surface resistivity was $10^{10}$, and the 90%/99% decay times were 0.01/0.01.

EXAMPLE 9

PLASTICIZED EO/ECH+POLYPROPYLENE ONE-STAGE HEAT MIXING (40 PARTS EO/ECH)

The individual ingredients for the composition of Example 7 were heat mixed together in a single step, and the resulting composition had a surface resistivity of about $10^{12}$ and 90%/99% decay times of 0.02/0.08, respectively (much poorer electrostatic dissipating properties than in Example 8).

EXAMPLE 10

(SBS+PLASTICIZED EO/ECH)+(POLYPROPYLENE) TWO-STAGE HEAT MIXING (20 PARTS EO/ECH)

About 27 parts SBS+Plasticized EO/ECH (Ingredient 4 listed above) was blended with 72 parts polypropylene and 0.72 parts antioxidant. The surface resistivity was $10^{12}$, and the 90%/99% decay times were 0.04/0.25 (very good electrostatic dissipating properties).

EXAMPLE 11

SBS+PLASTICIZED EO/ECH+POLYPROPYLENE ONE-STAGE HEAT MIXING (20 PARTS EO/ECH)

The individual ingredients of Example 10 were blended together in a single step, and the resulting composition had a surface resistivity of $10^{14}$, and 90%/99% decay times of 1.01 and greater than 5 respectively (very poor electrostatic dissipating properties).

EXAMPLE 12

(SBS+PLASTICIZED EO/ECH)+(POLYPROPYLENE) TWO-STAGE HEAT MIXING (30 PARTS EO/ECH)

About 40 parts SBS+Plasticized EO/ECH was heat mixed with 60 parts Polypropylene and 0.6 parts antioxidant. The surface resistivity was $10^{10}$, and the 90%/99% decay times were 0.01/0.04 (excellent electrostatic dissipating properties).

EXAMPLE 13

SBS+PLASTICIZED EO/ECH+POLYPROPYLENE ONE-STAGE HEAT MIXING (30 PARTS EO/ECH)

The ingredients of Example 12 were heat mixed together in a single step, and the resulting composition had a surface resistivity and 90%/99% decay times essentially the same as Example 12.

The above Examples are summarized in Table II.

TABLE II

| Example | Composition | Heat Mixing | Antistatic Properties |
|---|---|---|---|
| 2 | (SBS + EO/ECH) + (Polypropylene) (20% EO/ECH) | Two Stage | Excellent |
| 3 | (SBS + EO/ECH) + (Polypropylene) (20% EO/ECH) | One Stage | Very Poor |
| 4 | (Plasticized EO/ECH) + (Polypropylene) (20% EO/ECH) | Two Stage | Good |
| 5 | Plasticized EO/ECH + Polypropylene (20% EO/ECH) | One Stage | Very Poor |
| 6 | (Plasticized EO/ECH) + (Polypropylene) (30% EO/ECH) | Two Stage | Excellent |
| 7 | Plasticized EO/ECH + Polypropylene (30% EO/ECH) | One Stage | Good |
| 8 | (Plasticized EO/ECH) + (Polypropylene) (40% EO/ECH) | Two Stage | Excellent |
| 9 | Plasticized EO/ECH + Polypropylene (40% EO/ECH) | One Stage | Good |
| 10 | (SBS + Plasticized EO/ECH) + (Poly- | Two Stage | Very Good |

TABLE II-continued

| Example | Composition | Heat Mixing | Antistatic Properties |
|---|---|---|---|
| | propylene (20% EO/ECH) | | |
| 11 | SBS + Plasticized EO/ECH + Polypropylene (20% EO/ECH) | One Stage | Very Poor |
| 12 | (SBS + Plasticized EO/ECH) + (Polypropylene) (30% EO/ECH) | Two Stage | Excellent |
| 13 | SBS + Plasticized EO/ECH + Polypropylene (30% EO/ECH) | One Stage | Excellent |

As can be seen by the above examples, electrostatic dissipating properties are generally improved where polymer blending is done in a two-step fashion. Preferably, the oxirane copolymer (second component) is first heat mixed with a plasticizer, processing aid, impact modifier, and/or the like (third component); the remaining component is then added in a second heat mixing process.

The two-step blending requires less (relative to one-step blending) of the electrostatic dissipating second component to achieve comparable electrostatic dissipating performance. The improvement is best seen at lower levels of the second component. As the relative amount of second component is increased, the performance of the one-step and two-step processes seem to ultimately become substantially the same. Therefore ordinary skill and experimentation may be necessary for any particular embodiment of the present invention to determine the appropriate amounts of the various components.

In general, the second component is more expensive than the other components and is added primarily to provide electrostatic dissipating properties. If the second component is added in amounts greater than is absolutely necessary, the cost of the final blend is generally increased and unwanted properties of the second component may become more evident in the final material. The original embodiment is therefore quite advantageous, because it allows for lower concentrations of the second component than would be obtained in a conventional one-step blending process.

Compositions and two step processes of the original embodiment have been found to provide surprisingly effective surface resistivity for electrostatic dissipating applications, as well as good dimensional stability, ductility and the like.

The present embodiment of this invention relates to a polymer composition comprising three or more constituents. These constituents are a polymeric matrix composition, an ESD agent generally comprising an oxirane copolymer, and an ESD promoter. In addition, other additives may be added to this system. Examples of such additives include antioxidants, thermal stabilizers, UV stabilizers, fungicides, colorants, pigments, and the like.

It is generally believed that the present composition forms a tri-phase system. In this system, the matrix is the predominant ingredient and thereby forms the continuous phase when the concentration of this polymer matrix is high enough. In a two component system comprising the matrix and the ESD agent, it is believed that the ESD agent could also form a continuous phase, i.e. this ESD agent phase can be thought of as a network. In most instances higher concentrations of the ESD agent are necessary to achieve sufficient networks for dissipation of electrostatic charge. However, some problems are presented by a higher concentration of the ESD agent. For example, the ESD agent is more expensive than the matrix polymer. Further, a higher concentration of ESD agent reduces the toughness of the composition. Finally, for rigid applications such as computer housing and furniture, the higher concentration of ESD reduces the rigidity of the composition to an undesirable extent.

In general, the matrix and the ESD agent are incompatible, i.e., they form at least two separate phases detectable by thermal or mechanical analysis or microscopy so that the ESD agent is ionically conductive. Again, if it can be theorized that this agent forms a network, it is this network which permits the static charge to dissipate to the surface and bleed off.

In accordance with the present invention, at least a third component is added which has the effect of enabling reduction of the concentration of the ESD agent to achieve the same level of electrostatic dissipation as if the ESD agent were not reduced. This component has this effect although it does not act as an ESD agent itself. This result is surprising and unexpected. In this regard the third component can be termed an ESD promoter. One theory is that the component acts to promote the effectiveness of the ESD agent, i.e. the second component, to form a continuous phase or network which is co-continuous with the matrix. This promoter phase is believed to form a discrete third phase. In any case, there is a synergy between the promoter phase and the ESD agent. This synergy is further believed to result from an incompatibility between the promoter and the ESD agent, and more specifically, this means that there is no shift in either Tg of the host or additive based on the thermal analysis when the promoter is blended with the ESD agent.

The foregoing theory is merely a postulation as to why the promoter is effective. However, the invention should not be bound or limited in any way by this explanation.

The third component further allows reduction of the ESD agent so as to increase the relative toughness and/or rigidity of a blend composition for a given electrostatic dissipation value.

Within the present embodiment, the first constituent is a polymeric matrix composition comprising a plastic or an elastomer.

The plastic polymeric matrix compositions comprise homopolymers, copolymers or blends of polyolefins, urethanes, condensation polymers, vinyl polymers, and styrene polymers as well as mixtures thereof.

Preferred polyolefins include high density polyethylene, low density polyethylene, very low density polyethylene, linear low density polyethylene, chlorinated polyethylene, chloroprene, polypropylene, polybutene, polycycloolefin, ethylenepropylene terpolymer, grafted variations therein and the like. Preferred urethanes include polyester and polyether urethanes. Preferred condensation polymers include polycarbonates, polyesters, and polyamides. Preferred styrene polymers include polystyrene (PS), high impact polystyrene (HIPS), styrene-methyl methacrylate (SMMA), acrylonitrile-butadiene-styrene (ABS), styrene-acrylonitrile (SAN), styrene-ethylene/butylene-styrene, and styrenemaleic anhydride (SMA).

Preferred vinyl polymers include acrylates such as for example, polymethyl methacrylate, polyvinyl chloride (PVC), chlorinated polyvinyl chloride (CPVC); and polyvinyl acetate.

The preferred polyolefin is polyethylene or polypropylene or mixtures thereof. The preferred urethane is an ester based polyurethane. The preferred condensation polymer is a polyamide. The preferred styrene polymer is ABS, (acrylonitrile-butadienestyrene) or styrenic maleic anhydride, and the preferred vinylic polymer is PVC.

The reduction of the accumulation of static charge in polymeric matrix compositions is accomplished by the addition of a second constituent which is an ESD agent and generally comprises an oxirane copolymer. This copolymer is prepared from ethylene oxide and a heterocyclic monomer or a vinyl type monomer. The oxirane copolymer has an ethylene oxide content of from about 60–90 percent, preferably 60–85 percent and most preferably 65–85 percent with the remainder being supplied from either the heterocyclic comonomer or the vinyl type comonomer. The heterocyclic comonomer comprises a ring comprising an oxygen atom within two adjacent carbon atoms further wherein the ring has a pendant group. The pendant group is defined as an unsubstituted or substituted saturated or unsaturated group. Unsubstituted saturated groups include alkyls containing from 1 to about 4 carbon atoms. Especially preferred is a methyl group wherein the heterocyclic comonomer becomes propylene oxide. Unsubstituted unsaturated groups include alkenyls containing from 2 to about 6 carbon atoms. Preferred is an ethylene group wherein the heterocyclic comonomer becomes 3,4-epoxy1-butene. Further, the unsubstituted groups may comprise ring groups that are alicyclic or aromatic. The alicyclic groups contain from 4 to 6 carbon atoms and preferred is a cyclohexyl group wherein the heterocyclic comonomer becomes styrene oxide. The most preferred heterocyclic comonomer becomes 1,2-epoxyethylcyclohexane. A preferred aromatic is a phenyl group wherein the heterocyclic monomer becomes styrene oxide. The most preferred heterocyclic comonomer containing an unsubstituted pendant group is propylene oxide. Substituted pendant groups comprise alkyl groups containing from 1 to about 4 carbon atoms that are further substituted with a halogen comprising chlorine or bromine. Especially preferred is a methyl group further substituted with a chlorine atom wherein the heterocyclic comonomer becomes epichlorohydrin.

The vinyl type monomer is a monomer other than vinyl chloride. Such monomers include esters of acrylic acid wherein the ester portion has from 1 to about 12 carbon atoms, for example, methyl acrylate, ethyl acrylate, butyl acrylate, octyl acrylate, cyanoethyl acrylate, and the like; vinyl acetate; esters of methacrylic acid wherein the ester portion has from 1 to 12 carbon atoms, such as methyl methacrylate, ethyl methacrylate, butyl methacrylate, and the like; styrene and styrene derivatives having a total of from 8 to 15 carbon atoms such as alpha-methylstyrene, vinyl toluene, chlorostyrene; vinyl naphthalene; diolefins having a total of from 4 to 8 carbon atoms such as butadiene, isoprene, and including halogenated diolefins such as chloroprene; monoolefins having from 2 to 10 carbon atoms and preferably 2 to 4 carbon atoms; and the like; and mixtures of any of the above types of monomers and other monomers copolymerizable therewith known to the art and to the literature.

The preferred oxirane copolymer comprises ethylene oxide and epihalohydrin or propylene oxide. The most preferred oxirane copolymer comprises ethylene oxide and epichlorohydrin in a weight ratio of about 80:20. In the tables that follow, the oxirane copolymer used is identified as EO/ECH (80:20).

The third non ESD constituent of the present embodiment of this invention unexpectedly enhances the electrostatic dissipation performance of a blend containing the oxirane copolymer such as by acting as a promoter therefor. Further, the addition of this component may lead to enhanced physical properties of the composition.

The third constituent or promoter is incompatible with the ESD agent. It may comprise organic type materials such as chlorinated polyethylene (CPE), styrene-butadiene-styrene, styrene-ethylene/butylenestyrene, and styrene maleic anhydride (SMA). It may also comprise a substance which is nonconductive, and inert to both matrix and ESD agent phases such as glass beads, calcium carbonate, basalt, whiskers, wollastonite mica, kaolin, feldspar and nepheline, talc, barytes, microspheres, silicas, antimony oxide, aluminum oxide, boron filaments, and the like, as well as fibers of glass, nylon, Kevlar, polyester, and the like.

If it works according to the composition of the present invention, chlorinated polyethylene, styrene-butadiene-styrene, and styreneethylene/butylene-styrene are preferably employed as the promoter when the first constituent is polyvinyl chloride, chlorinated polyvinyl chloride, polyethylene, polypropylene, polystyrene, high impact polystyrene and styrene maleic anhydride. Furthermore, styrene maleic anhydride is preferred as a third constituent when the first constituent is poly-vinyl chloride, chlorinated polyvinyl chloride, polyethylene, polypropylene, polystyrene, high impact polystyrene and acrylonitrilebutadiene-styrene (ABS). Of course it should be understood that two or more of these compositions may be used in combination to constitute either the first or third constituents.

In the processing of the three constituents, constituents 1 and 2 can be premixed followed by the addition of the third constituent. Alternatively, constituents 1 and 3 can be premixed followed by the addition of the second constituent or constituents 2 and 3 can be premixed followed by the addition of the first constituent. Alternatively, all three constituents can be mixed together. Thus, in this invention, the constituents can be mixed in a single step or a two-step, or even a multiple step process.

Generally from about 45 to 90 weight parts, preferably from about 60 to 75 weight parts, and most preferably from about 60 to 70 weight parts of the first constituent with from about 10 to 40 weight parts, preferably from about 5 to 30 weight parts, and most preferably from about 10 to 20 weight parts of the second constituent and from about 5 to 30 weight parts, preferably from about 5 to 20 weight parts, and most preferably from about 5 to 15 weight parts of the third constituent are combined together to form the electrostatic dissipating composition of this invention.

The electrostatic dissipating compositions of this invention, either three constituents or 2 constituents, have a 90 percent and 99 percent decay time of less than 60 seconds and preferably less than 30 seconds and most preferably, 10 seconds as measured by Federal Test Method 101C.

As set forth above in the original embodiment, the blending is accomplished at a temperature greater than the melting temperature of the components being mixed. This blending temperature will depend on the compositions used and are primarily determined by the appropriate temperatures for the first and third phases. For example, a temperature around 140° C. may be appropriate for blending CPE, while 260° C. may be appropriate for blending polyester.

The following examples with the matrix polymers, oxirane copolymers, promoter polymers and ingredients as specified are mechanically melt mixed in a 4 inch electric heated mill at 200° C. for about 2 minutes and compression molded at 200° C. for 1½ minutes in a laboratory press to form samples for testing. The samples were conditioned for 24 hours at 15 percent relative humidity (RH). Static Decay is measured by applying a 5000 volt charge onto the sample and the amount of time in seconds for the charge to decay to 500 volts and 50 volts are respectively measured.

The data in Table III shows that an oxirane copolymer improves static decay rate of polystyrene (PS), Example 15 versus Example 14.

TABLE III

|  | Example | | | | |
| --- | --- | --- | --- | --- | --- |
|  | 14 | 15 | 16* | 17 | 18 |
| Polystyrene | 100 | 80 | 69 | 69 | 0 |
| EO/ECH (80:20) | — | 20 | 20 | 20 | 0 |
| Tin Stabilizer | — | 3 | 3 | 3 | 0 |
| Irganox 1010 | 1 | 1 | 1 | 1 | 0 |
| Styrene-ethylene/butylene-styrene | — | — | 10 | 10 | 100 |
| Static decay (sec) at 15% RH |  |  |  |  |  |
| 5000 to 500 volts | >5 | 0.72 | 0.41 | 0.83 | >60 |
| 5000 to 50 volts | >5 | >5 | 1.78 | 2.48 | >60 |

*A premix of oxirane copolymer, stabilizer and styrene-ethylene/butylene-styrene Table III also shows that the addition of the promoter polymer styrene-ethylene/butylene-styrene rubber in Examples 16 and 17 further improved the static decay rate over Examples 15 that does not contain the nonconducting styrene-ethylene/butylene-styrene polymer. In Example 16 the oxirane copolymer and the promoter polymer styrene-ethylene/butylene-styrene rubber were premixed prior to the addition to the polystyrene. In Example 17, no premixing took place. In Example 18, the promoter was tested by itself and shown to have a very high static decay rate indicating that it is a nonconducting polymer and does not act by itself as an ESD agent.

In Table IV, a high impact polystyrene (HIPS) is substituted for the polystyrene (PS) in Table III.

TABLE IV

|  | Example | | |
| --- | --- | --- | --- |
|  | 19 | 20 | 21* |
| HIPS | 100 | 80 | 69 |
| EO/ECH (80:20) | 0 | 20 | 20 |
| Tin Stabilizer | 0 | 3 | 3 |
| Irganox 1010 | 1 | 1 | 1 |
| Styrene-ethylene/butylene-styrene | 0 | 0 | 10 |
| Static decay (sec) at 15% RH |  |  |  |
| 5000 volts to 500 volts | >5 | 3.0 | 0.58 |
| 5000 volts to 50 volts | >5 | >5 | 2.13 |

TABLE IV-continued

|  | Example | | |
| --- | --- | --- | --- |
|  | 19 | 20 | 21* |
| 50 volts |  |  |  |

*a premix of oxirane copolymer, stabilizer and styrene-ethylene/butylene-styrene Table IV shows the improvements of static decay in HIPS by the addition of the oxirane copolymer and the nonconducting polymer styrene-ethylene/butylenestyrene rubber (Example 21) versus Example 19 or Example 20 of HIPS or a blend of HIPS and oxirane copolymer.

In Table V a styrene maleic anhydride (SMA) is substituted for the PS in Table III.

TABLE V

|  | Example | | |
| --- | --- | --- | --- |
|  | 22 | 23 | 24* |
| SMA | 100 | 80 | 69 |
| EO/ECH (80:20) | 0 | 20 | 20 |
| Tin Stabilizer | 0 | 3 | 3 |
| Irganox 1010 | 1 | 1 | 1 |
| Styrene-ethylene/butylene-styrene | 0 | 0 | 10 |
| Static decay (sec) at 15% RH |  |  |  |
| 5000 volts to 500 volts | >5 | 0.68 | 0.55 |
| 5000 volts to 50 volts | >5 | 2.64 | 1.93 |

*a premix of oxirane copolymer, stabilizer and styrene-ethylene/butylene-styrene Again, Table V shows the improvements of static decay rate of blends of SMA and oxirane copolymer by the incorporation of a styrene-ethylene/butylenestyrene elastomer.

Table VI shows the examples of polyvinyl chloride (PVC) according to the present invention. Chlorinated polyethylene (CPE) is employed as the third constituent.

TABLE VI

|  | Example | | | | | |
| --- | --- | --- | --- | --- | --- | --- |
|  | 25 | 26 | 27 | 28* | 29 | 30 |
| PVC | 85 | 80 | 70 | 70 | 70 | 0 |
| EO/ECH (80:20) | 15 | 20 | 15 | 15 | 20 | 0 |
| Tin Stabilizer | 3 | 3 | 3 | 3 | 3 | 0 |
| Irganox 1010 | 1 | 1 | 1 | 1 | 1 | 0 |
| CPE | 0 | 0 | 15 | 15 | 10 | 100 |
| Static decay (sec) at 15% RH |  |  |  |  |  |  |
| 5000 volts to 500 volts | 1.35 | 0.67 | 0.85 | 1.03 | 0.09 | >5 |
| 5000 volts to 50 volts | >5 | 3.67 | >5 | 4.4 | 0.56 | >5 |
| Notched Izod Impact (ft-lb/in) at room temp. | 3.5 | 3.1 | 19.0 | 19.0 | 15.0 | NA |

*a premix of oxirane copolymer, stabilizer and CPE.

The incorporation of a nonconducting CPE to a blend of PVC and oxirane copolymer simultaneously further improved the static decay rate and impact strength.

In Table VII the plastic is chlorinated polyvinyl chloride (CPVC) and the third constituent polymer is chlorinated polyethylene (CPE).

TABLE VII

| | Example | | |
|---|---|---|---|
| | 31 | 32 | 33 |
| CPVC | 100 | 80 | 70 |
| Tin Stabilizer | 3 | 3 | 3 |
| Lubricant | 1 | 1 | 1 |
| EO/ECH (80:20) | 0 | 20 | 20 |
| Irganox 1010 | 1 | 1 | 1 |
| CPE | 0 | 0 | 10 |
| Static decay (sec) at 15% RH | | | |
| 5000 volts to 500 volts | >3 | 1.04 | 0.25 |
| 5000 volts to 50 volts | >5 | >5 | 1.07 |
| Notched Izod Impact at room temp. (ft-lb/in) | 0.5 | 9 | 15 |

Unexpectedly, the incorporation of a nonconducting polymer CPE, to a blend of CPVC and oxirane copolymer further improved the static decay rate and impact strength.

In Table VIII the plastic is chlorinated polyvinyl chloride (CPVC) and the promoter polymer is styrene-maleic anhydride (SMA) which is a nonconducting polymer.

TABLE VIII

| | Example | | |
|---|---|---|---|
| | 34 | 35 | 36 |
| CPVC | 85 | 80 | 80 |
| Tin Stabilizer | 3 | 3 | 3 |
| Lubricant | 1 | 0.5 | 0.5 |
| EO/ECH (80:20) | 15 | 0 | 15 |
| Irganox 1010 | 1 | 1 | 1 |
| SMA | 0 | 20 | 20 |
| Static decay (sec) at 15% RH | | | |
| 5000 volts to 500 volts | >3 | Insulator | 0.26 |
| 5000 volts to 50 volts | >5 | Insulator | 1.35 |
| Notched Izod Impact ft-lb/in at room temperature | 10 | 0.9 | 10 |

Example 36 shows that the incorporation of a polymer of SMA improves the electrostatic dissipating performance of a blend of CPVC and an oxirane copolymer versus Example 34 not containing the SMA polymer. Example 35 shows that a plastic (CPVC) not containing the oxirane copolymer gives an insulating composition rather than the electrostatic dissipating compositions of this invention.

In Table IX the plastic is ABS and the promoter polymer is styrene-maleic anhydride (SMA).

TABLE IX

| | Example | | | |
|---|---|---|---|---|
| | 37 | 38 | 39 | 40 |
| ABS | 100 | 85 | 45 | 0 |

TABLE IX-continued

| | Example | | | |
|---|---|---|---|---|
| | 37 | 38 | 39 | 40 |
| EO/ECH (80:20) | 0 | 15 | 15 | 0 |
| Tin Stabilizer | 0 | 0.2 | 0.2 | 0 |
| SMA | 0 | 0 | 40 | 100 |
| Static decay (sec) at 15% RH | | | | |
| 5000 volts to 500 volts | * | * | 1.89 | * |
| 5000 volts to 50 volts | * | * | 9.41 | * |
| Notched Izod Impact (ft-lb/in) at room temperature | 4.0 | 3.3 | 4.3 | |

*Insulator

The incorporation of a nonconducting polymer of SMA to a blend of ABS and an oxirane copolymer (Example 39 versus Example 38) improves the electrostatic dissipative property of the blend. Further, the inclusion of the nonconducting SMA polymer improves the impact strength of the blend (see Example 39 versus Example 38).

In Table X the elastomer, first constituent, is chlorinated polyethylene (CPE).

TABLE X

| | Example | |
|---|---|---|
| | 41 | 42 |
| CPE | 100 | 85 |
| EO/ECH (80:20) | 0 | 15 |
| Tin Stabilizer | 3 | 3 |
| Irganox 1010 | 1 | 1 |
| Static decay (sec) at 15% RH | | |
| 5000 volts to 500 volts | >5 | 0.08 |
| 5000 volts to 50 volts | >5 | 0.36 |

Example 41 is a baseline of mainly elastomer and this example has very poor electrostatic dissipative properties. The elastomer containing an oxirane copolymer, Example 42, has very good electrostatic dissipative properties.

In Table XI the elastomer, first constituent is styrene-ethylene/butylene-styrene.

TABLE XI

| | Example | |
|---|---|---|
| | 43 | 44 |
| Styrene-ethylene/butylene-styrene | 100 | 80 |
| EO/ECH (80:20) | 0 | 20 |
| Irganox 1010 | 1 | 1 |
| Static decay (sec) at 15% RH | | |
| 5000 volts to 500 volts | Insulator | 0.16 |
| 5000 volts to 50 volts | Insulator | 0.50 |

Example 44 shows that the incorporation of an oxirane copolymer improves the electrostatic dissipating performance of an elastomer verses Example 43 wherein the elastomer is free from oxirane copolymer.

TABLE XII

| | Example | | | | | | | | |
|---|---|---|---|---|---|---|---|---|---|
| | 45 | 46 | 47 | 48 | 49 | 50 | 51 | 52 | 53 |
| Chlorinated Polyethylene | 88 | 75 | 60 | 63 | 48 | 85 | 73 | 70 | 58 |
| EO/ECH (80:20) | 12 | 0 | 0 | 12 | 12 | 0 | 12 | 0 | 12 |
| Tin Stabilizer | 3 | 3 | 3 | 3 | 3 | 3 | 3 | 3 | 3 |
| Irganox 1010 | 1 | 1 | 1 | 1 | 1 | 1 | 1 | 1 | 1 |
| Glass Beads | 0 | 25 | 40 | 25 | 40 | 0 | 0 | 0 | 0 |
| Glass Fibers | 0 | 0 | 0 | 0 | 0 | 15 | 15 | 30 | 30 |

TABLE XII-continued

| | Example | | | | | | | | |
|---|---|---|---|---|---|---|---|---|---|
| | 45 | 46 | 47 | 48 | 49 | 50 | 51 | 52 | 53 |
| Static Decay (sec) 15% Relative Humidity | | | | | | | | | |
| 5000 volt to 500 volt | 0.78 | Ins* | Ins* | 0.08 | 0.02 | Ins* | 0.12 | >50 | 0.04 (sec) |
| 5000 volt to 50 volt | 2.32 | Ins* | Ins* | 0.35 | 0.05 | Ins* | 0.43 | >50 | 0.10 |

*Insulator

In Table XII, the elastomer is chlorinated polyethylene ("CPE"). Example 45 is a blend of CPE with ESD agent. Examples 46 and 47 are blends of CPE with glass beads, indicating the glass beads to be an electrical insulator. Examples 48 and 49 show the improvement of static decay rate of blends of CPE and ESD agent by the incorporation of a third insulator component, glass bead (as compared to example 45). Similarly, Examples 50 and 52 indicate that glass fiber is an electrical insulator and cannot be used as an ESD agent. However, when glass fiber is incorporated in blends of CPE and ESD agents, the static decay rate is improved (compare Examples 45, 51 and 53).

While in accordance with the Patent Statutes, the best mode and preferred embodiment has been set forth, the scope of the invention is not limited thereto, but rather by the scope of the attached claims.

What is claimed is:

1. An electrostatic dissipating composition which is at least a three component tri-phase system and wherein
    said first component comprises from about 45 to about 90 weight parts of a polymer matrix which forms a first continuous phase and is a styrene polymer;
    said second component comprises from about 10 to about 40 weight parts of a polymeric electrostatic dissipating agent which is the copolymerization product of from about 60 to about 90 weight percent of ethylene oxide with from about 10 to about 40 percent by weight of a heterocyclic monomer or vinyl type monomer, said second component having a volume resistivity of from about $10^6$ to about $10^{12}$ ohm. cm, and forming a second continuous phase;
    and said third component comprises from about 5 to about 30 weight parts of an electrostatic dissipating promoter which is glass fibers, whereby said electrostatic dissipating composition has a 90 percent static decay of less than or equal to about 60 seconds.

2. An electrostatic dissipating composition as set forth in claim 1, wherein said matrix comprises one or more of styrene-butadiene-styrene, styrene-ethylene/-butylene-styrene and chloroprene.

3. The composition of claim 2, wherein the heterocyclic monomer comprises epichlorohydrin or propylene oxide, and wherein the vinyl type monomer comprises esters of acrylic acid or methacrylic acid wherein the ester portion has from 1 to about 12 carbon atoms.

4. The composition of claim 3, wherein the matrix is present at from 60 to 75 percent by weight, and
    the oxirane copolymer is present at from at from about 10 to 40 percent by weight wherein the heterocyclic monomers comprise epichlorohydrin and wherein the esters of acrylic acid or methacrylic of the vinyl type monomer are methyl esters.

* * * * *